(No Model.) 4 Sheets—Sheet 1.

S. C. NASH.
PORTABLE CAMERA.

No. 315,156. Patented Apr. 7, 1885.

(No Model.) 4 Sheets—Sheet 2.

S. C. NASH.
PORTABLE CAMERA.

No. 315,156. Patented Apr. 7, 1885.

Witnesses
Harold Serrell
Chas H Smith

Inventor
Scotto C. Nash
per Lemuel W. Serrell
Atty.

(No Model.) 4 Sheets—Sheet 3.
S. C. NASH.
PORTABLE CAMERA.
No. 315,156. Patented Apr. 7, 1885.
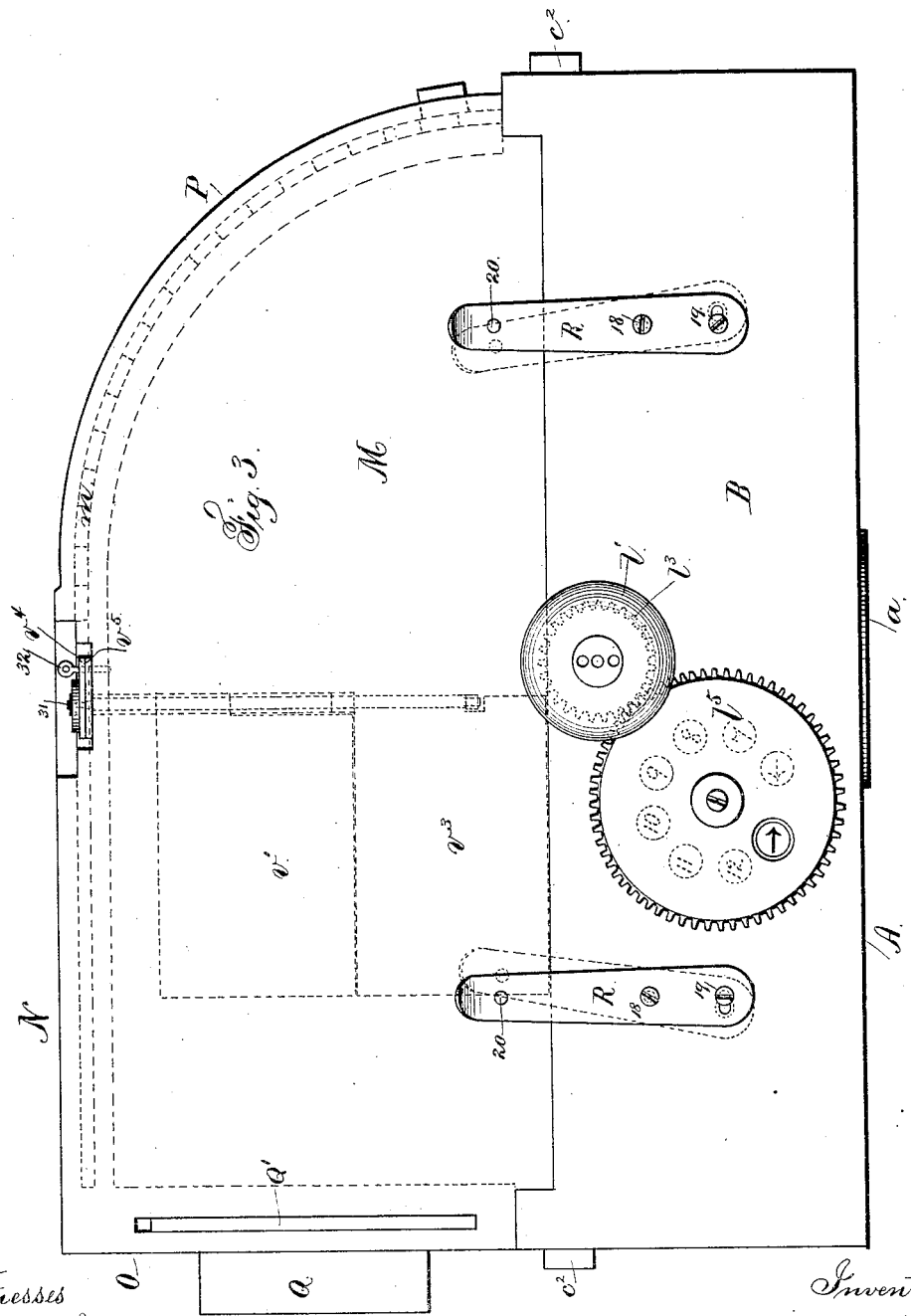

(No Model.)
4 Sheets—Sheet 4.
S. C. NASH.
PORTABLE CAMERA.
No. 315,156.      Patented Apr. 7, 1885.
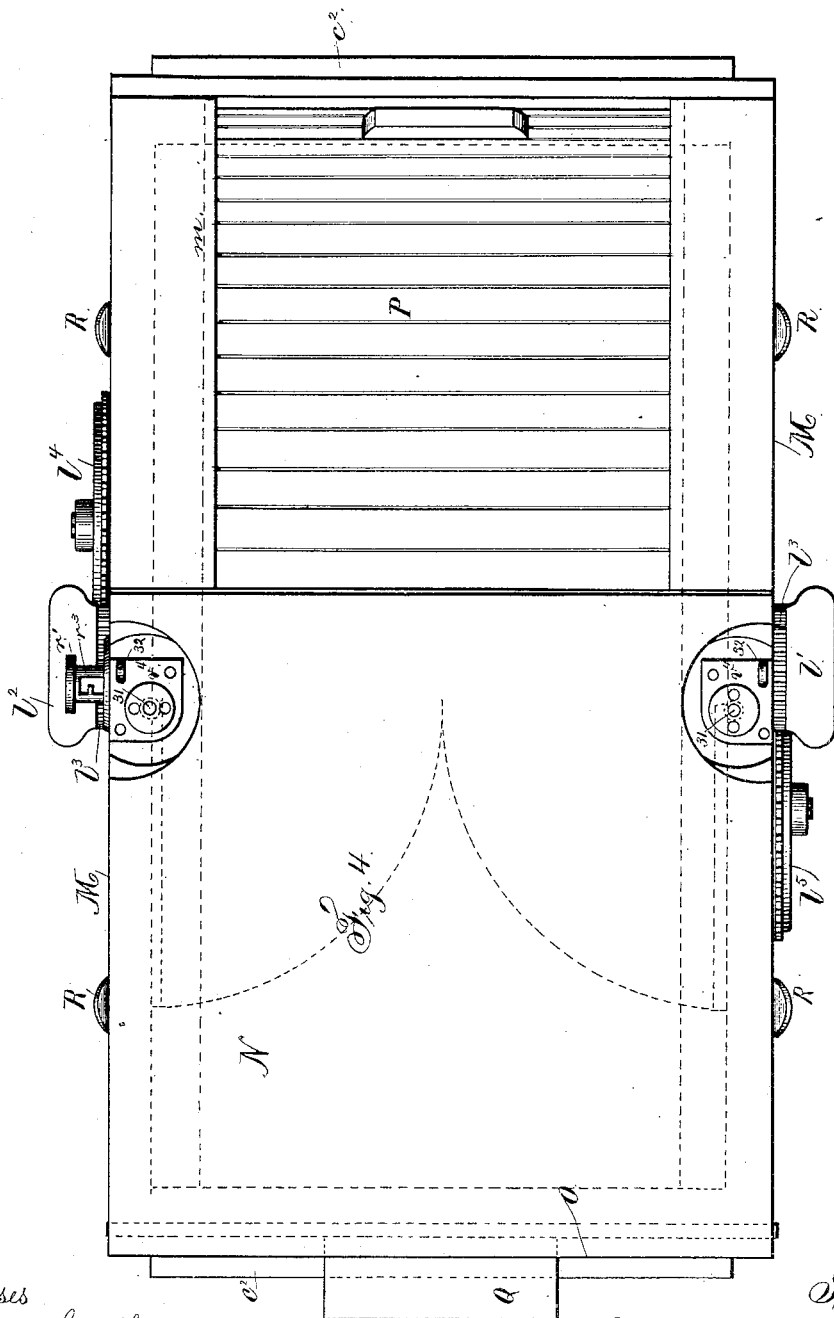
Witnesses
Harold Serrell
Chas. H. Smith
Inventor
Scotto C. Nash
per Lemuel W. Serrell
Atty

UNITED STATES PATENT OFFICE.

SCOTTO C. NASH, OF HARRISBURG, PENNSYLVANIA.

PORTABLE CAMERA.

SPECIFICATION forming part of Letters Patent No. 315,156, dated April 7, 1885.

Application filed June 14, 1884. (No model.)

*To all whom it may concern:*

Be it known that I, SCOTTO C. NASH, of Harrisburg, in the State of Pennsylvania, have invented an Improvement in Portable Cameras, of which the following is a specification.

This camera is especially available for field use, so that tourists, amateurs, and others can carry a number of plates fully protected from the light, and bring into focus any desired one of the several plates without exposing either of the other plates. I make use of a box containing a belt of plate-holders, the glasses or plates in which are at opposite sides of the holders, and there are sliding covers over the box. A camera is movably received upon the top of the plate-holder box, and contains a lens at one end and a movable cover at the other end; also an adjusting device for holding the movable focus-glass and for grasping and holding in place the plate while the picture is being taken. The camera is reversible, so that it may be turned end for end upon the box and used in connection with the plates at the other sides of the plate-holders; and I employ a counting device by which, in connection with a list made at time of filling the plate-holders, the operator is enabled to know at any time, without opening the box, the exact position of each plate, and to bring into the proper plane for exposure the kind of plate best adapted to any desired view. Thus may be easily kept an accurate account of the plates as they are successively exposed, and the risk of double exposures is entirely avoided. I also provide for covering the plate in sections, so as to take small pictures upon parts of the plate where a part of the sectional cover has been removed.

Figure 1:
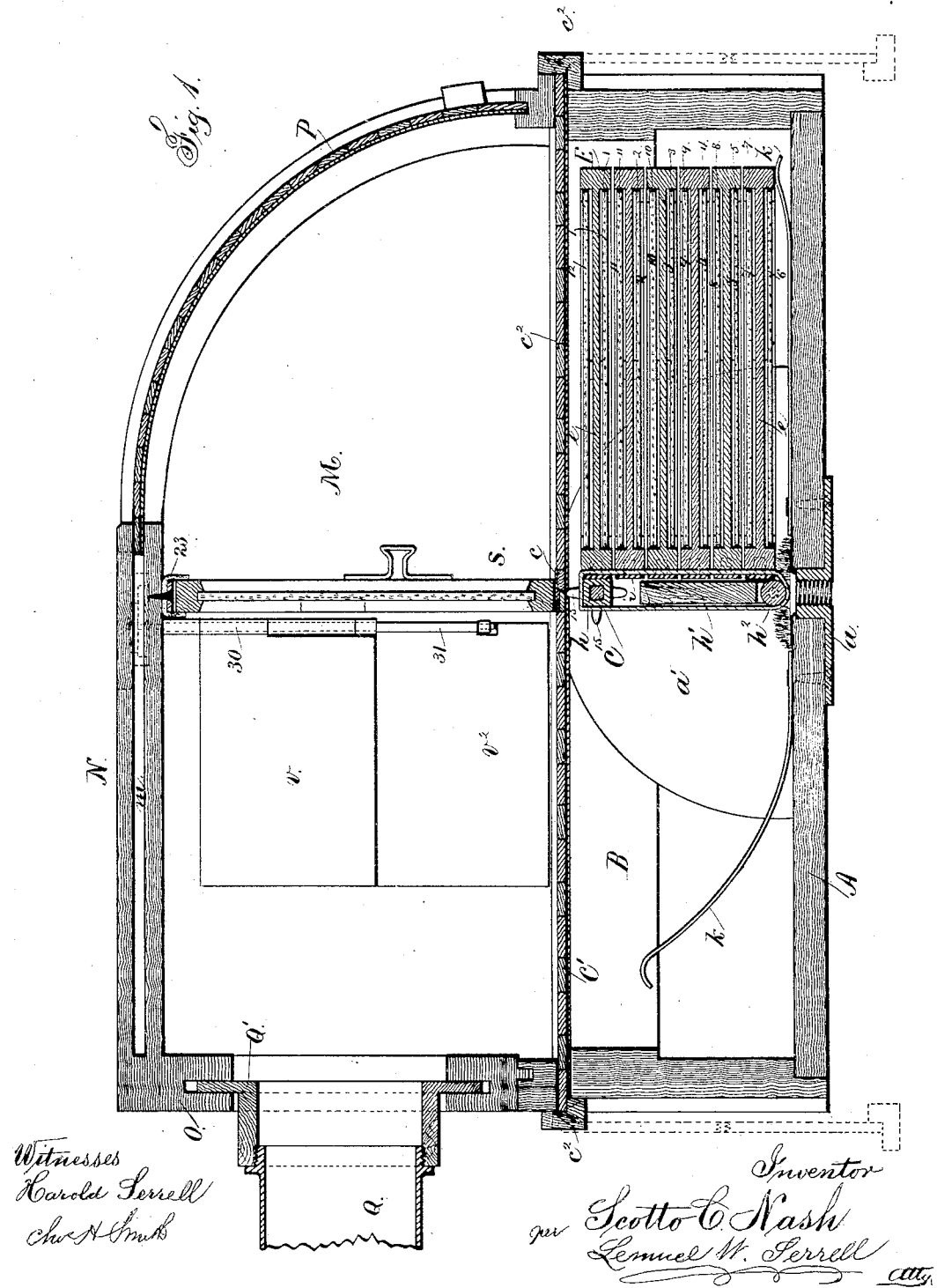
Figure 2:
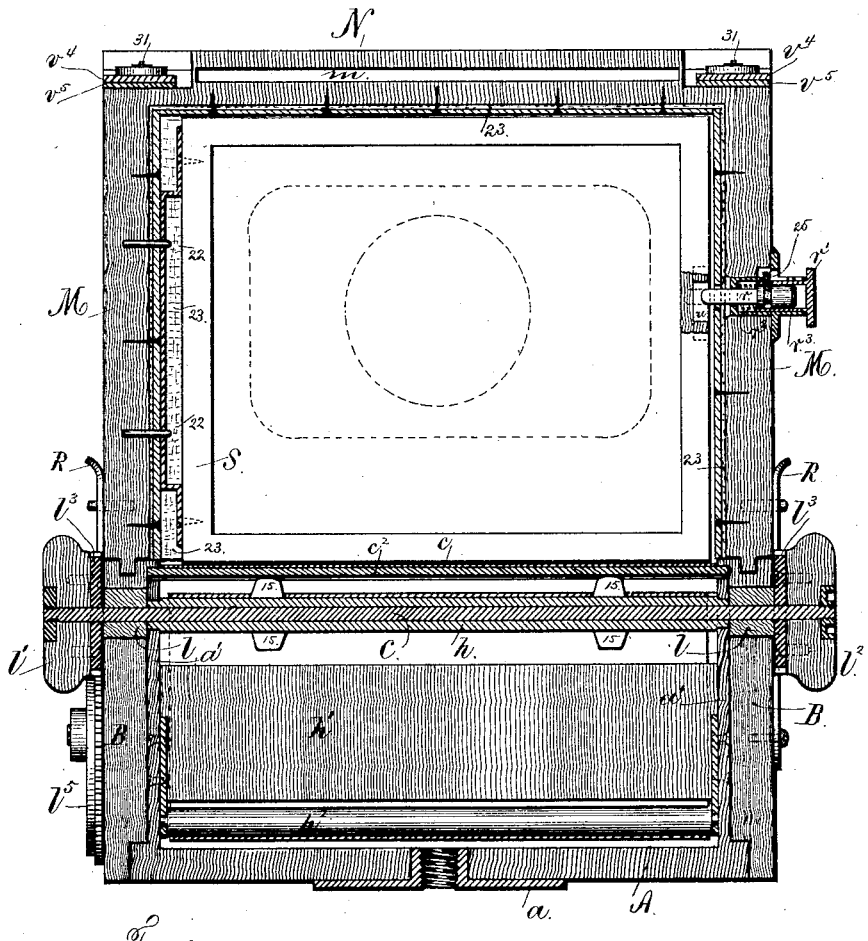
Figure 5:
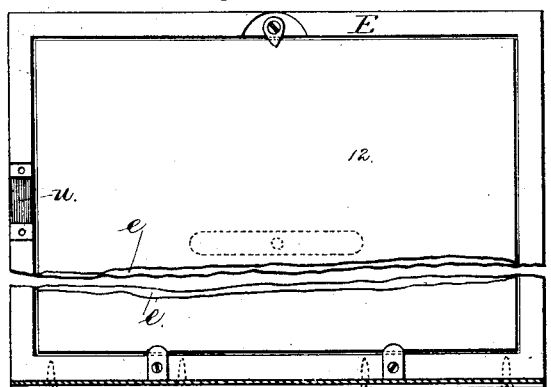
Figure 6:
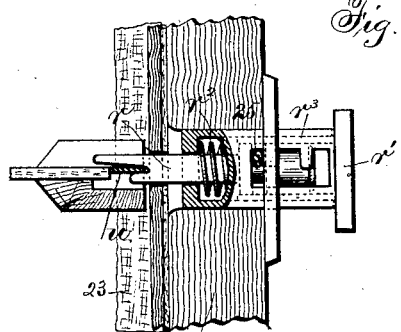

In the drawings, Figure 1 is a vertical longitudinal section. Fig. 2 is a cross-section of the camera and its parts near the middle. Fig. 3 is an elevation of the camera, showing the counting device. Fig. 4 is a plan of the camera. Fig. 5 is an elevation of the upper and lower parts of one of the holders for the plates, and Fig. 6 is a sectional plan in larger size, showing the device for holding the plate.

The base A of the camera is usually provided with a plate, $a$, by which it is screwed to the top of a tripod or stand. Upon this plate is a box, B, that contains the chain or belt of sensitized plates, hereinafter described. The box is rabbeted around its lower inner edge for the reception of the base-plates A, so that light will be excluded, and the parts may be screwed together by screws; but usually there will be side pieces, $a'$, made permanently with the base A and recessed into the inner faces of the box B, so that the axle C of the chain of pictures passing through both the box B and the side pieces, $a'$, will hold the base and box together.

In the inner faces of the box B there are grooves, and in the ends of the box there are slots for the reception of the sliding lids $C'$ $C^2$. These lids are each preferably made of transverse slats glued upon a piece of canvas, so as to be flexible and hang down out of the way when drawn out, as indicated by the dotted lines, Fig. 1. At the inner end of each lid there is a cross-lip, $c$, to prevent the lid being pulled out too far, and to aid in intercepting any light, and at the outer end there is the cross-bar $c^2$, that closes tightly against the end of the box when the lids are slipped in. I also prefer to introduce velvet or fur at the slots for the lids to pass through, so that the pile of the velvet will more effectually exclude light, but not interfere with the movement of the slide-lids. When the slide-lids are closed, the plates contained in the box are effectually inclosed from the action of light. There is a movable camera that is applied upon this box, as hereinafter described, and when so applied the lids can be withdrawn, and either one of the sensitized plates turned up into the focus, and the picture taken upon the same, and then the plate can be turned down into the box A B and the lids closed again.

In transportation the camera and the box A B can be carried together or separate.

Before describing the camera-box I will describe the chain of plate-holders. Each plate-holder E is preferably of wood in the form of a frame, with a central diaphragm or partition, $e$, so that there are recesses at opposite sides for the reception of the sensitized plates numbered 1 to 12. Each plate-holder has ears to hold the bottoms of the plates in place, and turn-buttons at the tops by which the plates are buttoned in. A bow-spring at the back of each plate, fastened upon the partition $e$, presses the plate forward against the ears and buttons, so that the surface may be properly in focus when acted upon by the adjusting device hereinafter described. One edge of each plate-holding frame is firmly fastened to the chain or belt that connects the holders. I prefer to use a strong woven fabric or chamois-skin re-enforced by longitudinal lines of stitching for the belt, and to apply plates of metal $i$ and screws to clamp the belt to the plate-holders. The number of plate-holders shown is six, and the depth of the box A B is sufficient to receive these when placed one upon the other; and the axle C is across the middle of the box A B, so that the picture-holders can be all on either side of the axle, or else some on one side and some upon the other side, while one of the plate-holders is in a vertical position for receiving the picture. The axle C is square and passes through a square roller, $h$, upon which are teeth 15, entering mortises in the plates $i$ and recesses in the inner edges of the plate-holders, so that the roller $h$, when turned, will move the plate-holders, swinging them up in succession into the camera, and then down into the other end portion of the box. There is a partition, $h'$, inside the belt, and a roller, $h^2$, around and beneath which the belt passes. This roller has its axles in end bearings upon the partition $h'$, and this partition $h'$ can be moved up or down between the side pieces, $a'$, and clamped, so as to strain the belt carrying the plate-holders and prevent its becoming too slack. There are bow-springs $k$ fastened upon the base A, upon which the outer ends of the plate-holders rest, to prevent the holders straining the belt by their leverage, and these springs yield and allow the plate-holders to settle down bodily by the accumulated weight of the holders. These springs also raise the plates as they are lifted and swung up successively. The ends of the roller $h$ are cylindrical, so as to take proper bearings in the side pieces, $a'$, and there are cylindrical bushings $l$ around the axle C, where it passes through the box B, so as to form proper journals for such axle C. The knobs $l'\ l^2$ upon the ends of the axle C are used for revolving the same, and to each knob a gear-wheel, $l^3$, is fastened, and upon the sides of the box B there are dials of paper or other suitable material fastened, and over these dials are the count-wheels $l^4\ l^5$, each having a hole through it. These count-wheels gear into the wheels $l^3$; hence they are revolved first in one direction and then in the other as the belt of plate-holders is moved.

The operator, when taking his pictures, is usually at one end of the box A B and camera, and in using the right hand will turn the knob $l'$ or $l^2$ at that side of the camera. I therefore mark the dials, so that when all the plate-holders are in one end an arrow is exposed through each wheel $l^4\ l^5$, indicating the positions of the plate-holders. (See Fig. 3.)

When the first plate-holder is turned up, the number 1 is exposed at the count-wheel $l^4$ and the number 12 at the count-wheel $l^5$, and when the second plate-holder is brought up to place the numbers 2 and 11 are exposed, and so on, the operator knowing by the direction of the lens of the camera which of the two plates is being acted upon by the light, and by a list he can mark the names of places or persons to each picture, and in this manner determine which plates have been used without opening the box.

It is preferable to place a number upon one corner of each sensitized plate while in the dark-room, and place them in the order indicated in the plate-holding box.

The camera itself is composed of the sides M, top N, and front O, and there is a movable cover to give access to the ground glass in focusing.

It is preferable to employ a cover of slats, P, upon a canvas lining, and to provide grooved segmental ways $m$, in which the ends of the cover may run, and a double top, so that the cover may be moved up and pass in between the two parts of the top when the focus is being taken, and the same is to be drawn down to exclude the light before either of the lids $c'$ or $c^2$ is withdrawn.

Around the top edges of the box B there are grooves, and around the bottom edges of the camera there are ribs fitting these grooves, or vice versa, so that light may be effectually excluded at the joints.

The camera may be placed upon the box B with the lens-tube Q in either direction, the parts being made to fit, so that when pictures are to be taken upon the plates 1 to 6 the camera will be placed upon the box in one direction, and when pictures are to be taken from 7 to 12 the camera will be reversed.

Upon the sides of the box B there are the connecting-plates R. Each is attached by a screw, 18, and there is a second screw, 19, the hole for which is slotted transversely of the plate, and there is a hole at the upper end of the plate, and a stud, 20, upon the camera. The plates are made of spring-brass and the upper ends bent outwardly, so that the studs 20 press them back as the camera is set down to its place upon the box. The slots for the screws 19 allow the plates to be swung so that the holes in the upper portions will receive the studs 20 and hold the camera and box together, and when they are to be separated the upper ends of the spring-plates are drawn back and swung partially aside, so that the studs are free, and the camera can be lifted and reversed.

The front end, $o$, of the camera is made double, and to the lens-tube Q there is a septum-plate, Q', firmly attached. This septum-plate is between the two parts of the double end $o$, and the lens-tube and septum-plate can be moved laterally or up or down, to adjust the lens opposite to the portion of the plate upon which the picture is to be taken, and no light can pass into the camera laterally.

The frame S, holding the ground glass, is made with an extension upon one edge, preferably the left hand, with holes in it, so that the same may be set over the pins 22 inside the camera-case at that side. These pins, however, are not in the way of the plate-holders, and there are flexible shields of woven fabric or velvet at 23 to intercept lateral rays from the front to the back of the camera. The adjusting and holding device for the focusing-glass is also used for the plate-holders as they are brought up to place. This holding device is in the form of a fork, $r$, (see Figs. 2 and 6,) that is square in the shank and passes through a mortise in the side of the camera. The outer end of this fork is round, and has upon it a cylinder with a button-head, $r'$. The spring $r^2$ within the fixed tubular case $r^3$ serves to project the fork and cylinder outwardly; but the screw 25 in the notched slot in the case $r^3$ limits the movement. When the screw 25 is in the outer end of the slot, the fork $r$ is entirely out of the way of the plate-holders. When the fork is pushed in and the parts turned so that the screw 25 is held in the first notch, the longer and forward end of the fork $r$ is brought into the path of a plate, $u$, fixed upon the edge of the plate-holder, or a similar one upon the edge of the frame of the ground glass, and forms a stop, and when the fork is pressed in the said plate is received between the parts of that fork and firmly held until the fork is drawn back.

It is to be understood that each plate $u$ is in the plane of the surface of the sensitized plate or of the ground surface of the focusing-glass; hence the sensitized surface when brought up to place occupies the same position as the ground-glass surface.

In order to cover any portion of the plate, I make use of a shield in four sections. The sections $v$ and $v'$ are upon tubular axles 30 at the inner sides of the camera. The sections $v^2 v^3$ are upon solid axles 31, passing through the tubular axles 30, and at the upper ends, outside the camera, these axles are provided, respectively, with turn-buttons or heads $v^4 v^5$, firmly attached, so that either section can be swung over the plate as a shield, and be held by a pin, 32, inserted vertically through the head. When not in use, these shields lie close against the inner surfaces of the sides of the camera, and the pins 32 inserted through the holes in the heads hold them in place.

Caps may be used to cover the heads or turn-buttons $v^4 v^5$ as a precaution against light passing in; but this is not required, because the heads or turn-buttons are flat plates setting closely together and against the bottom of the recess they occupy in the camera. In this description I have referred to six plate-holders with twelve plates. By simply increasing the depth of the box B without adding in the least to its other dimensions a larger number of plates may be introduced.

I claim as my invention—

1. The combination, with a camera, of a box and a series of plate-holders united by a belt, a roller for moving the plate-holders up into position successively, and means for holding the plate in its position while the picture is being taken, substantially as set forth.

2. The combination, with the belt and plate-holders, of a box surrounding the same, means for moving such belt of plate-holders, a camera above and connected to the plate-holder box, and lids to the plate-holder box, substantially as set forth.

3. The box B, with a movable bottom, A, and side pieces, $a'$, in combination with the belt and plate-holders, the roller for moving the same, and the partition and roller within the belt and between the sides $a'$, substantially as set forth.

4. The combination, with the plate-holders, of a belt, clamping-plates to connect the belt to the plate-holders, and a polygonal roller with teeth for moving the plate-holders and belt, substantially as set forth.

5. The combination, with the box A B, of the plate-holders, the belt connecting the same, the polygonal roller for moving the belt, and the springs upon which the outer ends of the plate-holders rest, substantially as set forth.

6. The combination, with the plate-holders and the belt connecting the same, of the polygonal roller, a square axle passing through the same, the journals for the axle, and the knobs upon the ends of the axle, substantially as set forth.

7. The combination, with the plate-holders, the belt connecting the same, and the means for moving the belt, of a box inclosing the parts and sliding covers composed of slats upon a flexible material, substantially as set forth.

8. In combination with the lens-holder and a flat septum attached to the same, a camera-box having a double front end, with a space between the two parts of the end, into which the septum is received and within which it can be moved laterally, substantially as set forth.

9. The combination, with the plate-holders and a belt to connect the same, of a box, sliding lids for the same, and a camera that can be reversed, so as to take pictures upon plates at either side of the plate-holders, substantially as set forth.

10. The camera-box having a front end and sides with segmental grooves, in combination with a cover formed of slats united by flexible material, the ends of the slats being within the grooves, substantially as set forth.

11. The forked stop, spring, turning-head, and notched case, in combination with the plates $u$ and the plate-holders or focusing-frame, substantially as specified.

12. The combination, with the camera-box, of sectional shields within the box, and the axes of the same extending through the camera-box, and turn buttons or heads for the same, substantially as set forth.

13. The combination, with the plate-holders, the belt for connecting the same, and the roller for moving the belt, of a counting device for indicating the plates that are brought successively into place for the pictures, as set forth.

Signed by me this 2d day of June, A. D. 1884.

SCOTTO C. NASH.

Witnesses:
J. L. WEAVER,
L. R. WEAVER.